(12) United States Patent
Vardimon et al.

(10) Patent No.: US 12,347,230 B2
(45) Date of Patent: Jul. 1, 2025

(54) HIGH RESOLUTION FACE MATCHING

(71) Applicant: CORSIGHT.AI, Tel Aviv (IL)

(72) Inventors: Ran Vardimon, Tel Aviv (IL); Yarden Yaniv, Tel Aviv (IL); Matan Noga, Tel Aviv (IL); Gadi Piran, Upper Saddle River, NJ (US)

(73) Assignee: CORSIGHT.AI. LTD., Tel Aviv (IL)

( * ) Notice: Subject to any disclaimer, the term of this patent is extended or adjusted under 35 U.S.C. 154(b) by 158 days.

(21) Appl. No.: 17/305,812

(22) Filed: Jul. 14, 2021

(65) Prior Publication Data

US 2022/0019770 A1   Jan. 20, 2022

Related U.S. Application Data

(60) Provisional application No. 62/705,762, filed on Jul. 14, 2020.

(51) Int. Cl.
*G06K 9/46* (2006.01)
*G06F 18/22* (2023.01)
*G06T 11/00* (2006.01)
*G06V 40/16* (2022.01)

(52) U.S. Cl.
CPC ............ *G06V 40/172* (2022.01); *G06F 18/22* (2023.01); *G06T 11/00* (2013.01); *G06V 40/171* (2022.01)

(58) Field of Classification Search
CPC ......................................... G06V 40/16–40/179
See application file for complete search history.

(56) References Cited

U.S. PATENT DOCUMENTS

| | | | | |
|---|---|---|---|---|
| 5,999,637 | A * | 12/1999 | Toyoda | G06Q 20/4014 |
| | | | | 382/280 |
| 8,442,278 | B2 * | 5/2013 | Bedros | G06T 7/292 |
| | | | | 382/118 |
| 2019/0065833 | A1 * | 2/2019 | Wang | G06V 40/172 |

* cited by examiner

*Primary Examiner* — Brian Werner
(74) *Attorney, Agent, or Firm* — Reches Patents

(57) ABSTRACT

Systems, and method and computer readable media that store instructions for high-resolution face recognition.

19 Claims, 14 Drawing Sheets

400

HIGH RESOLUTION FACE MATCHING

BACKGROUND

Facial recognition provides a global score indicative of a match between one face to the other. This global score may provide only partial information regarding the relationship between two faces.

There is a growing need to provide a face matching scheme of higher resolution.

SUMMARY

There may be provided systems, methods and computer readable medium as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
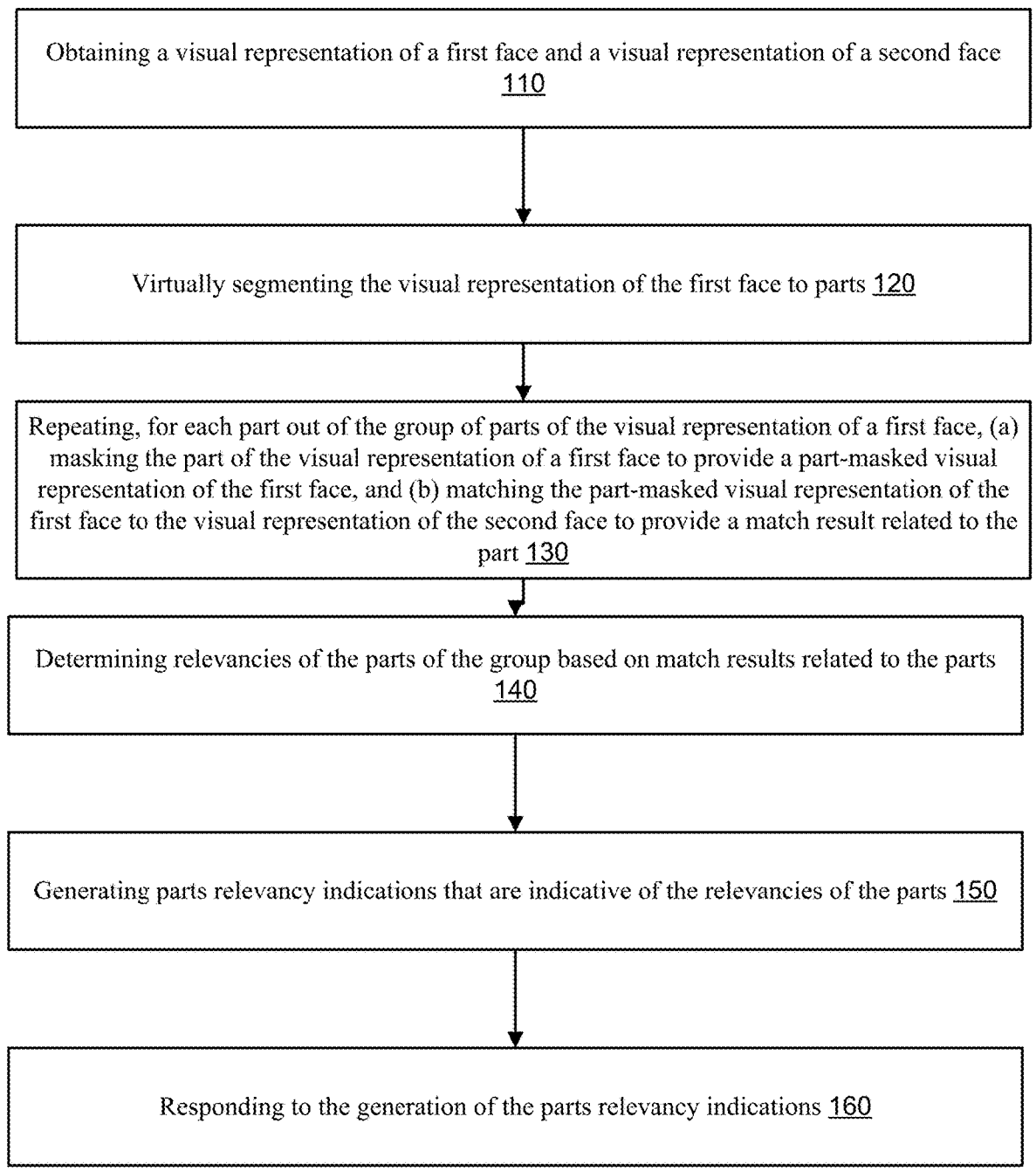
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information unit. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

The term "substantially" means insignificant deviation—for example differences that do not exceed few percent of a value, differences that are below the accuracy and/or resolution related to the face recognition process. What is substantially may be defined in any manner.

There may be provided a method for high resolution face matching. The term "high resolution" is used to indicate that the method is not limited to provide a matching result regarding the entire face—but may provide an indication regarding matches of different parts of the face.

FIG. 1 illustrates an example of method 100.

Method 100 may start by step 110 of obtaining a visual representation of a first face and a visual representation of a second face.

The visual representations of the first and second faces are substantially aligned and are substantially of the same size.

Step 110 may include, at least one out of, aligning the visual representations of the first face and the second face, expanding and/or shrinking and/or rotating of pixels, cropping the visual representations of the first and/or second faces from an image, filtering, noise reduction, smoothing, illumination compensating, and the like.

The first face may be compared to reference faces (for example reference faces of known persons) that may include the second face. Alternatively—the comparisons between the first and second faces may be performed under other circumstances (for example the second face may not be a reference face of a known person).

Figure 2:
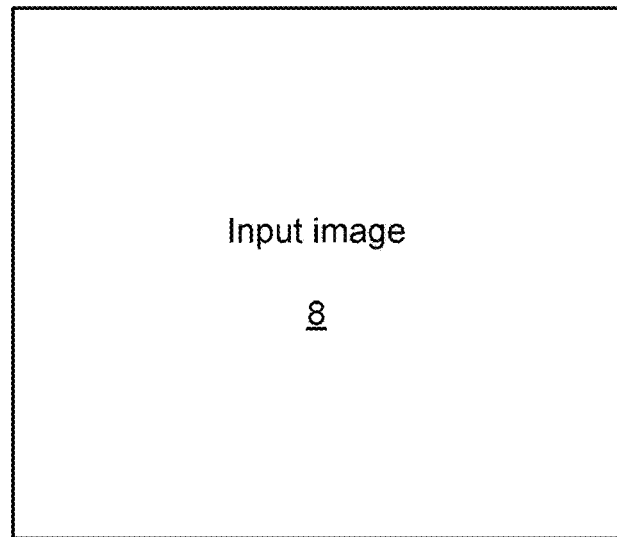
FIG. 2 is an example of an input image and a visual representation of a first face.
Figure 2:
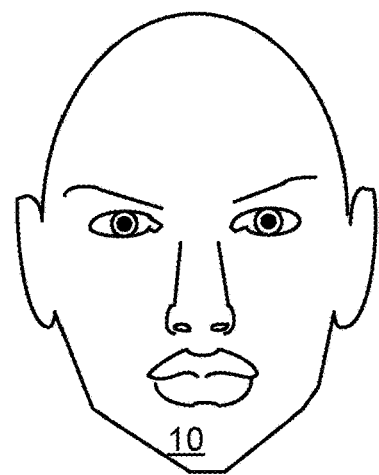

Referring to FIG. 2, an input image 8 may be obtained in any manner, a visual representation of a first face 10 is extracted from the input image, aligned to a predefined alignment, sized to a predefined size, and the like.

Figure 3:
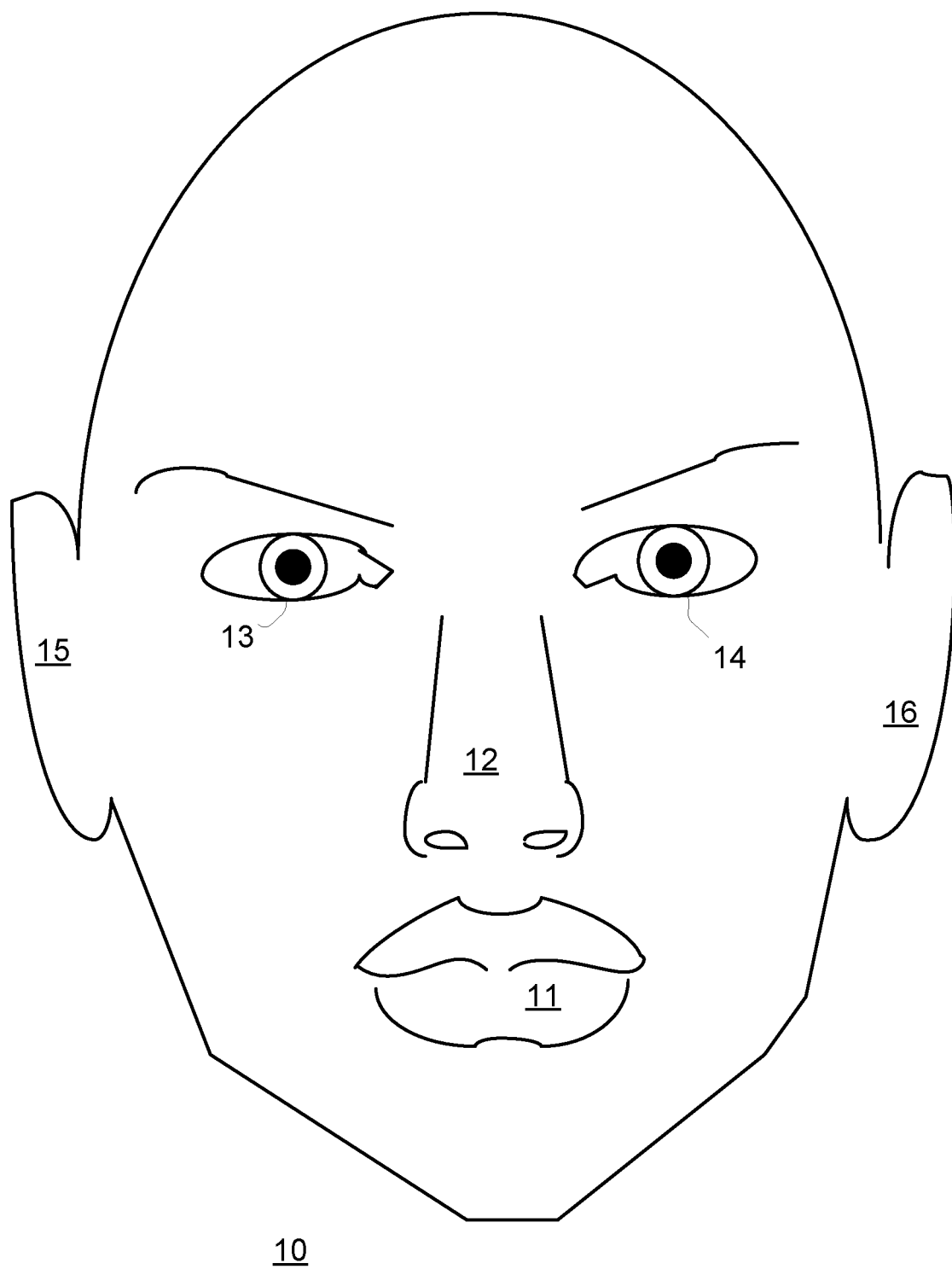
FIG. 3 is an example of a visual representation of a first face.

Referring to FIG. 3—a visual representation of a first face 10 is shown as including facial artifacts such as first mouth 11, first nose 12, first right eye 13, first left eye 14, first right ear 15, and first left ear 16.

Figure 4:
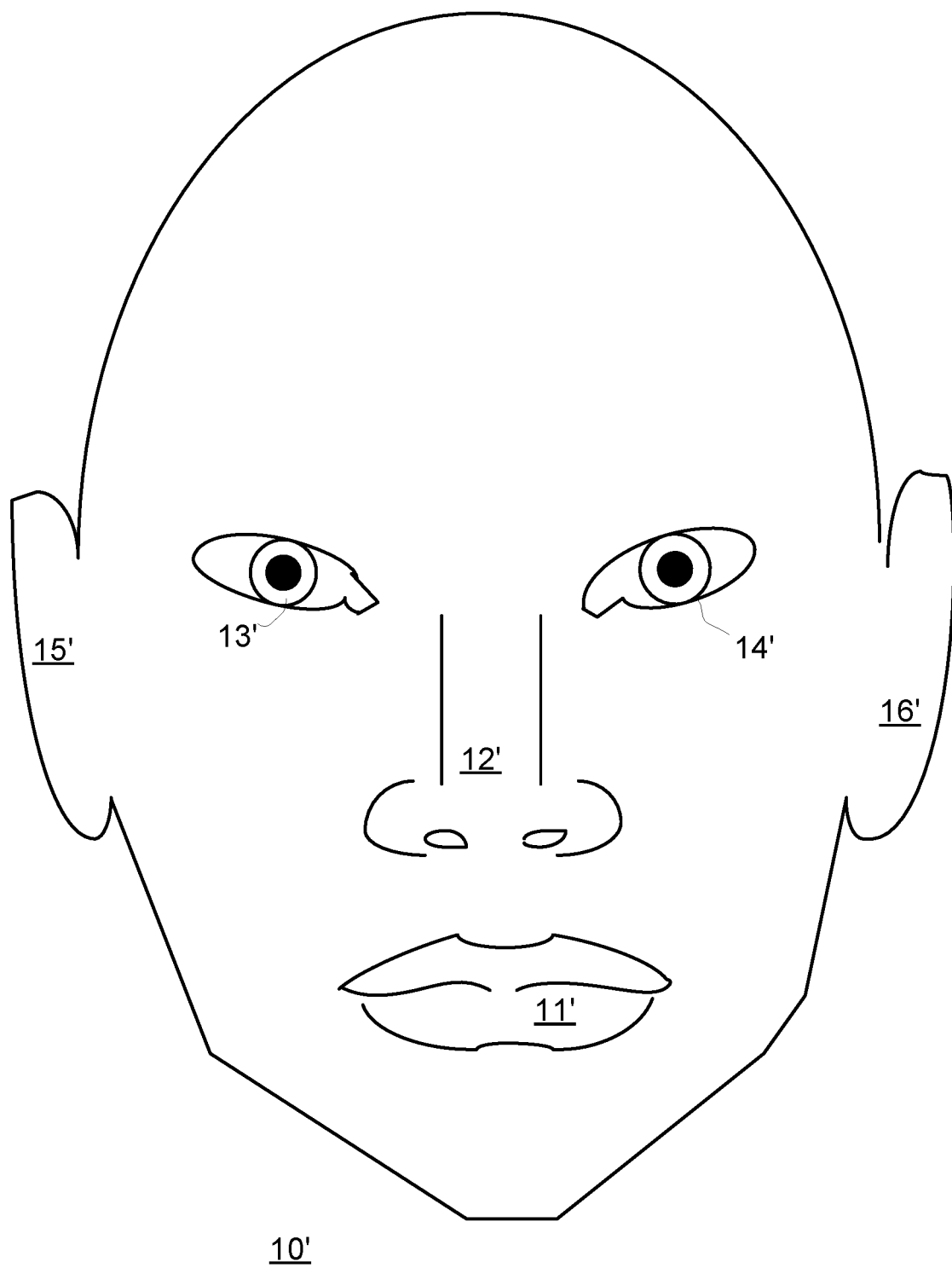
FIG. 4 is an example of a visual representation of a first face.

Referring to FIG. 4—a visual representation of a second face 10' is shown as including facial artifacts such as second mouth 11', second nose 12', second right eye 13', second left eye 14', second right ear 15', and second left ear 16'.

Referring back to FIG. 1—step 110 may be followed by step 120 of virtually segmenting the visual representation of the first face to parts. The different parts may form a group of parts. The group may cover the entire first face or may cover only a part of the first face.

The parts may be of any shape and/or size. Different parts may be of the same shape and size. Different parts may differ from each other by shape and/or size.

The parts are smaller than the entire face. Smaller parts may provide higher resolution—but may increase the number of calculations and/or may increase the duration of execution of method 100.

One or more parts may cover one or more facial artifacts—or may cover only one or more segments of one or more facial artifacts.

Figure 5:
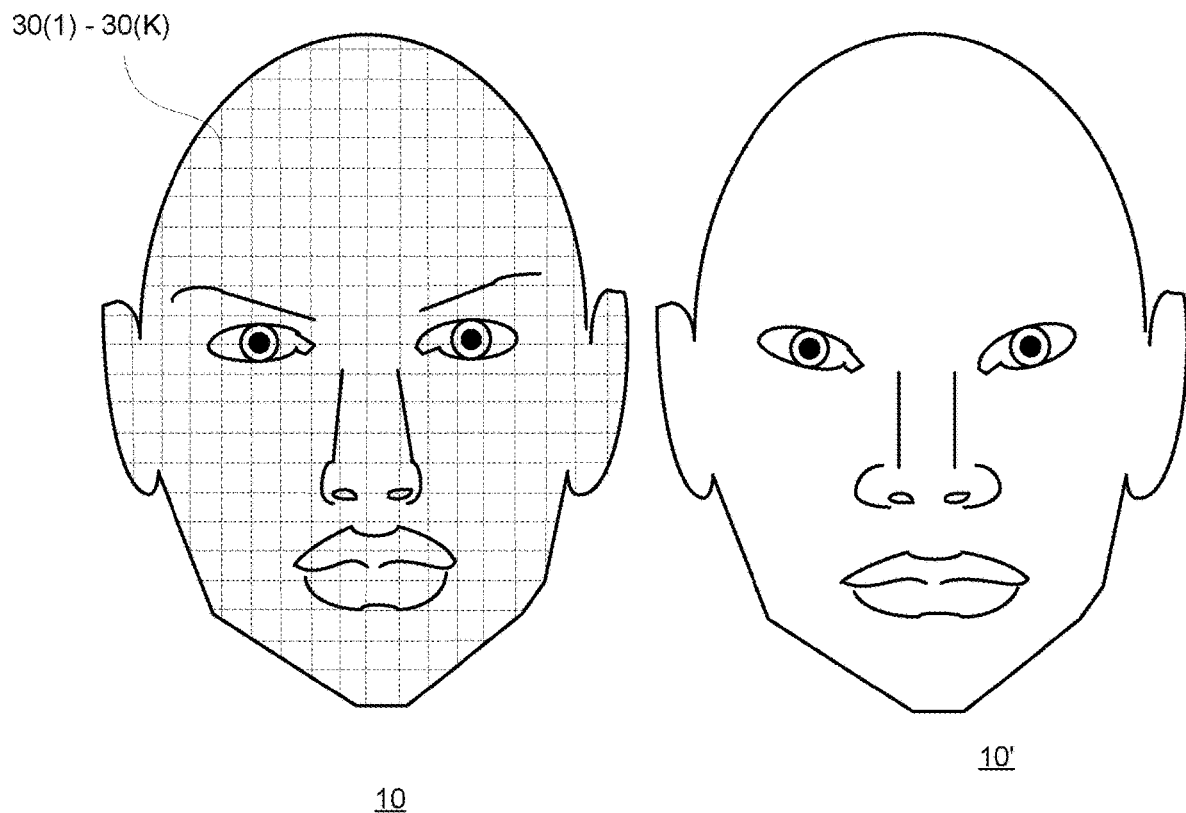
FIG. 5 is an example of a virtually segmented visual representation of a first face and of a visual representation of a second face.

Referring to FIG. 5—first face is virtually segmented to K parts 30(1)-30(K). K is an integer that exceeds two. In FIG. 5 the parts are rectangles and are equal to each other. This is merely a non-limiting example of the parts.

FIG. 5 also illustrates second face 10' being at the same size and orientation as first face 10.

Referring back to FIG. 1—step 120 may be followed by step 130 of repeating, for each part out of the group of parts of the visual representation of a first face, (a) masking the part of the visual representation of a first face to provide a part-masked visual representation of the first face, and (b) matching the part-masked visual representation of the first face to the visual representation of the second face to provide a match result related to the part.

The matching may include using embeddings (for example one dimensional vector of features that may be optimized for matching).

It should be noted that temporal results related to the matching between different parts that are unmasked may be stored and used to reduce the number of calculations. For example—the matching between unmasked parts of the part-masked visual representation of the first face and parts of the visual representation of the second face may be used when calculating matches between different part-masked visual representations of the first face and the visual representations of the second face.

Figure 6:
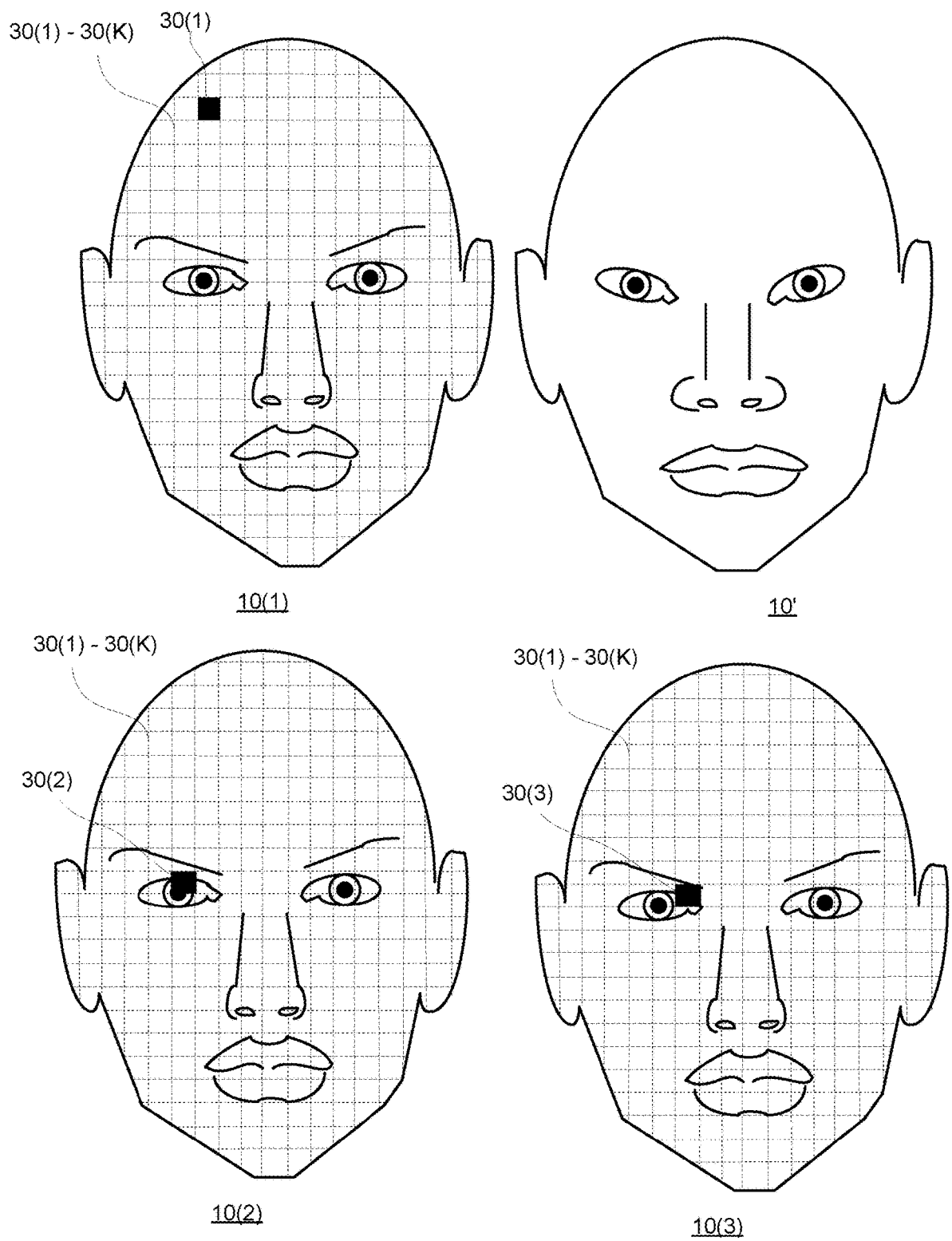
FIG. 6 is an example of part-masked visual representation of a first face and of a visual representation of a second face.

Referring to FIG. 6 that shows examples of first masked part 30(1), second masked part 30(2), and third masked part 30(3). The masking of the first, second and third masked parts provides first part-masked visual representation of the first face 10(1), second part-masked visual representation of the first face 10(2), and third part-masked visual representation of the first face 10(3). Assuming that all parts are masked then step 130 generated K part-masked visual representation of the first face.

Each one of the K part-masked visual representation of the first face may be matched to the visual representation of the second face 10' to provide K match results (see FIG. 7)—such as first Match Result (10(1), 10') 20(1), second Match Result (10(2), 10') 20(2) till K'th Match Result (10(K), 10') 20(K).

Referring back to FIG. 1—step 130 may be followed by step 140 of determining relevancies of the parts of the group based on match results related to the parts.

Figure 7:
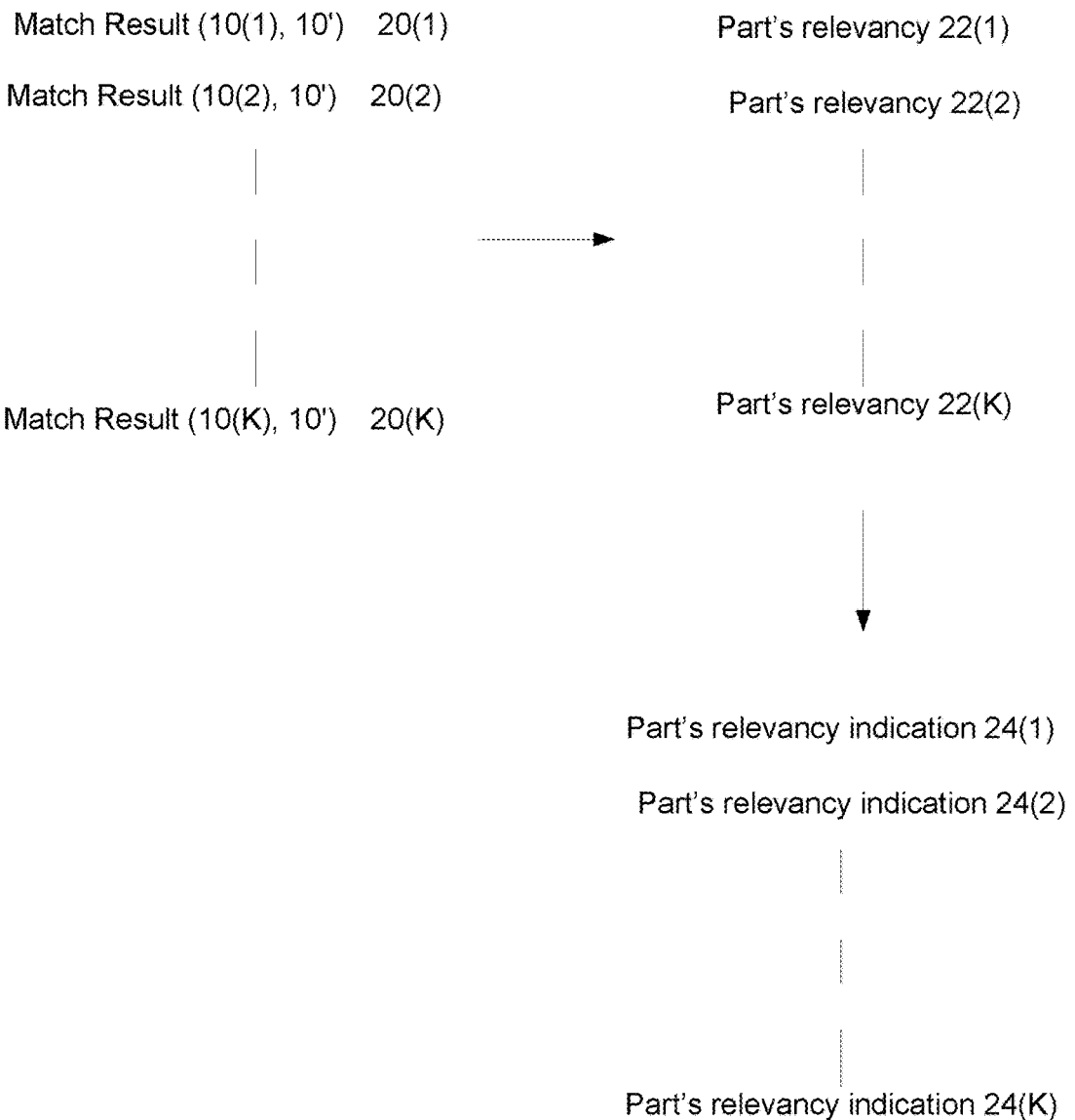
FIG. 7 is an example of various variables, results and indications.

Referring to FIG. 7—first Match Result (10(1), 10') 20(1), second Match Result (10(2), 10') 20(2) till K'th Match Result (10(K), 10') 20(K) are converted to first part's relevancy score 22(1), second part's relevancy score 22(2), till K' th part's relevancy score 22(K).

It is expected that masking an irrelevant masked part (for example first masked part 30(1)) will have a minor impact on the outcome of the matching. It is also expected that a relevant masked part (for example each one of second masked part 30(2) and third masked part 30(3)) will have a more significant impact on the outcome of the matching.

Accordingly—it is expected that:

The first Match Result (10(1), 10') 20(1) will indicate of a first similarity level between the first part-masked visual representation of the first face 10(1) and the visual representation of the second face 10'.

The second Match Result (10(2), 10') 20(2) will indicate of a second similarity level between the second part-masked visual representation of the first face 10(2) and the visual representation of the second face 10'.

The first similarity level exceeds the second similarity level.

Referring back to FIG. 1—step 140 may be followed by step 150 of generating parts relevancy indications that are indicative of the relevancies of the parts. The indications may form a heat map that may be overlaid over the visual representation of the first face 10(1), or may be presented in any other manner. The indicators may be visual indicators, numerical indicators, textual indicators, and the like.

Step 150 may be followed by step 160 of responding to the generation of the parts relevancy indications.

Step 160 may include, for example at least one out of populating a database with the parts relevancy indications, displaying the parts relevancy indications, and transmitting the parts relevancy indications.

Figure 8:
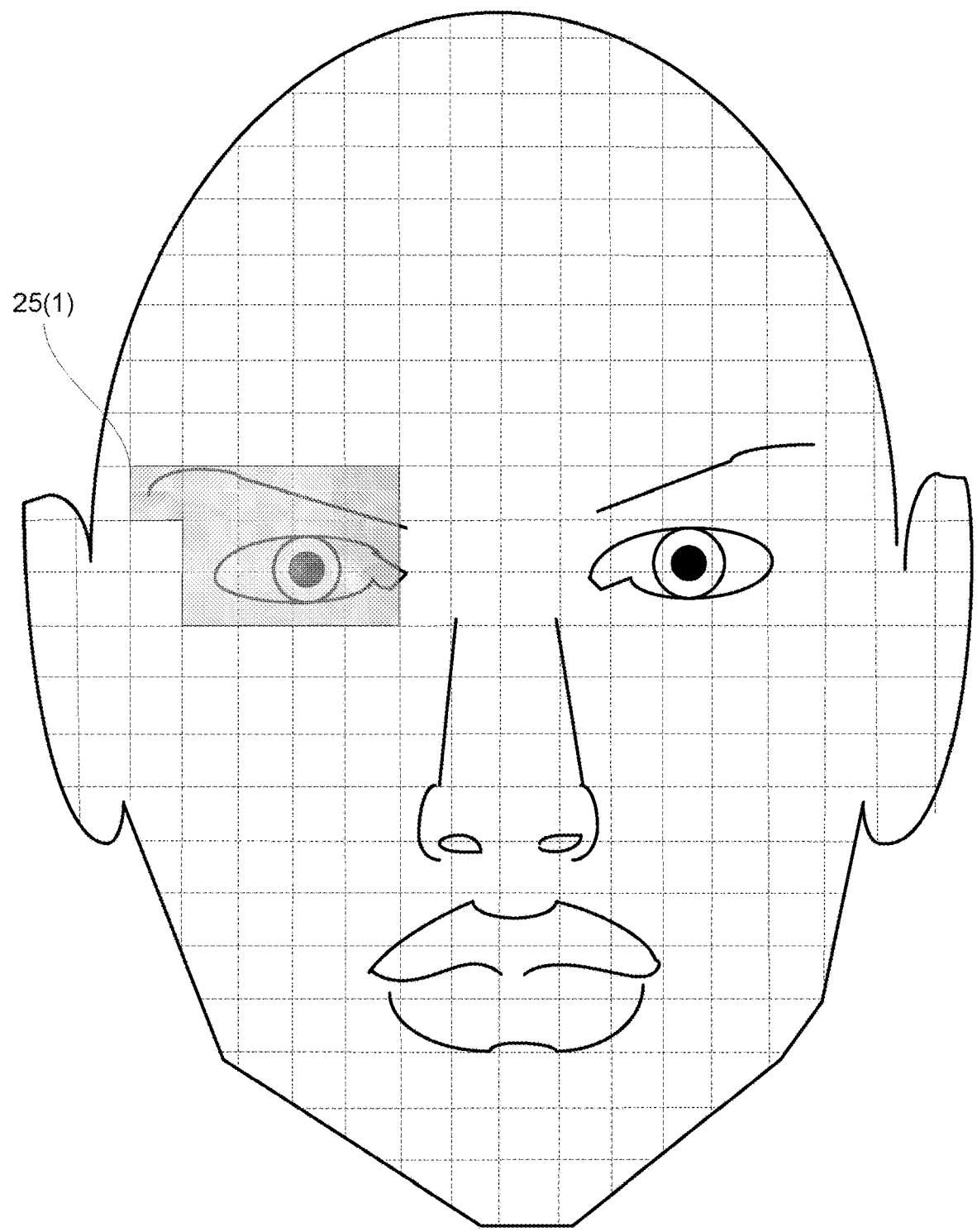
FIG. 8 is an example of a heatmap.

Step 160 may include, for example, overlaying the parts relevancy indications on the visual representation of the first face. See, for example, FIG. 8 that illustrates a first group of highly relevant parts—denoted 25(1). Other groups were not shown for brevity of explanation.

Step 160 may include, for example, displaying a heatmap that represents parts relevancies.

There may be provided a method for high resolution face matching that uses outputs of intermediate layers of a convolutional neural network (CNN). The intermediate layers output information regarding properties of images that are not complete object detection conclusions.

Method 100 may include running indexing multiple times (for example—as number of grid points) for each image to get a matching-grid resolution (each iteration may cover a relevant grid point). Method 200 may perform a single indexing.

Figure 9:
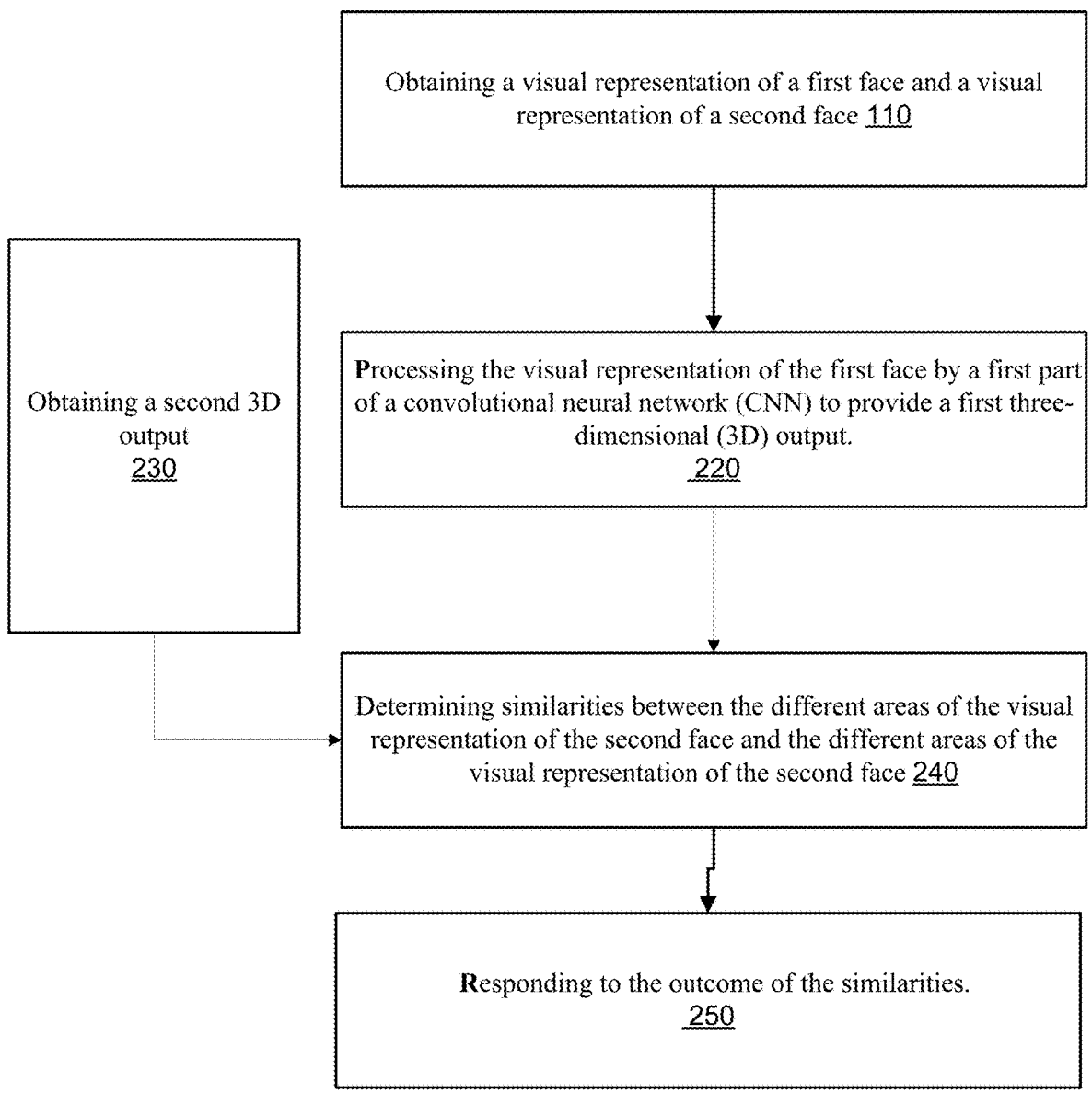
FIG. 9 illustrates an example of a method.

FIG. 9 is an example of method 200 for high resolution face matching.

Method 200 may start by step 110 of obtaining a visual representation of a first face and a visual representation of a second face. The visual representations of the first and second faces are substantially aligned and are substantially of the same size.

Step 110 may be followed by step 220 of processing the visual representation of the first face by a first part of a convolutional neural network (CNN) to provide a first three-dimensional (3D) output.

The first 3D output includes multiple first feature vectors. Different first feature vectors are associated with different areas of the visual representation of the first face. Each vector is associated with a key point of a grid of key points. The value of each vector is responsive to values within an area of the visual representation of the first face.

Method 200 may also include step 230 of obtaining a second 3D output. The second 3D output may be generated by processing the visual representation of the second face by the first part of the CNN to provide a second 3D output. The second 3D output may include multiple second feature vectors. Different second feature vectors are associated with different areas of the visual representation of the second face. Step 230 may include generating the second 3D output. Step 230 may include retrieving the second 3D output. For example—when the second face is a reference face—there is no need to compute the second 3D output each time the reference faces are searched.

The second 3D output includes multiple second feature vectors. Different second feature vectors are associated with different areas of the visual representation of the second face. Each vector is associated with a key point of a grid of key points. The value of each vector is responsive to values within an area of the visual representation of the second face.

Figure 11:
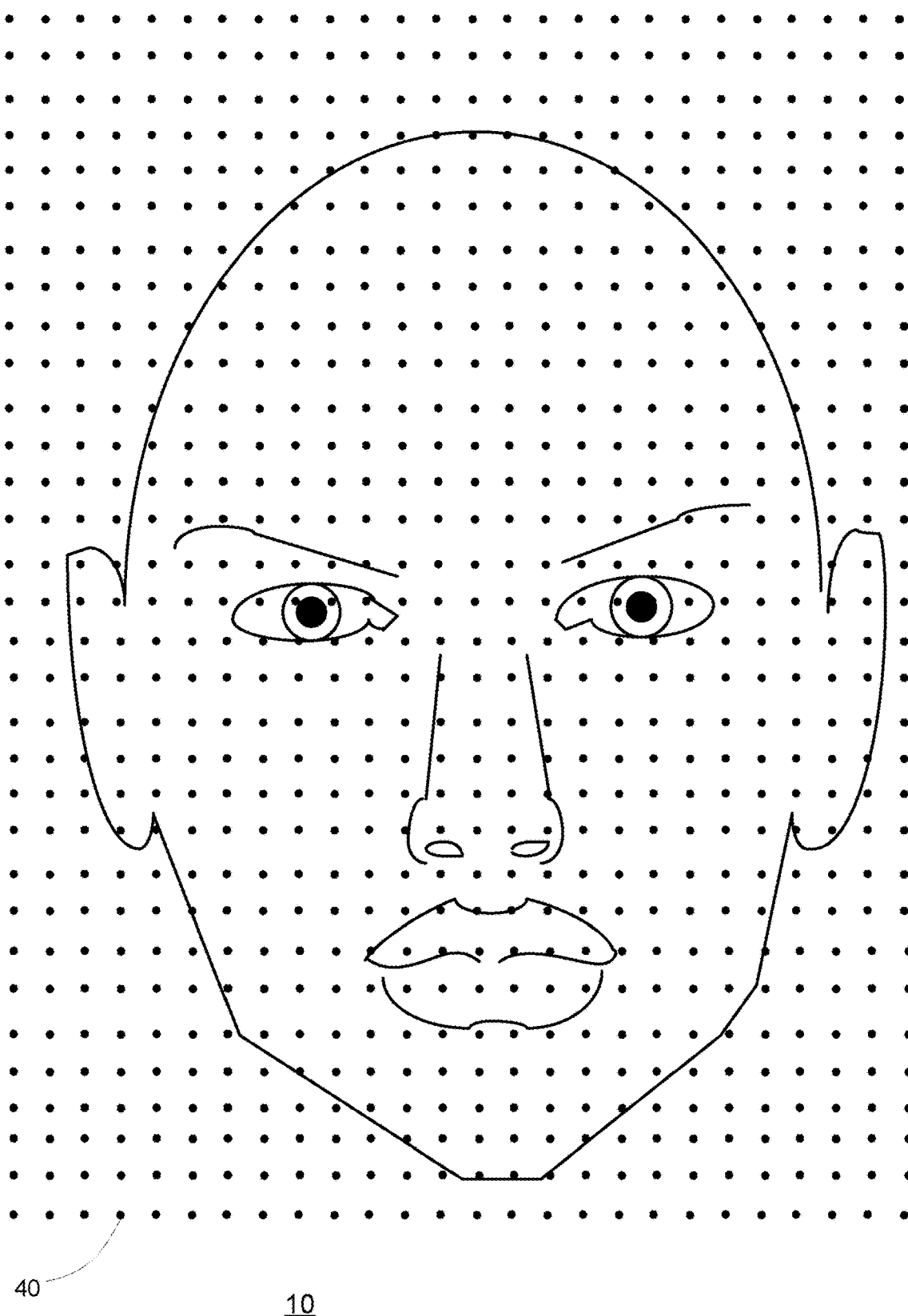
FIG. 11 is an example of key points and a visual representation of a first face.
Figure 12:
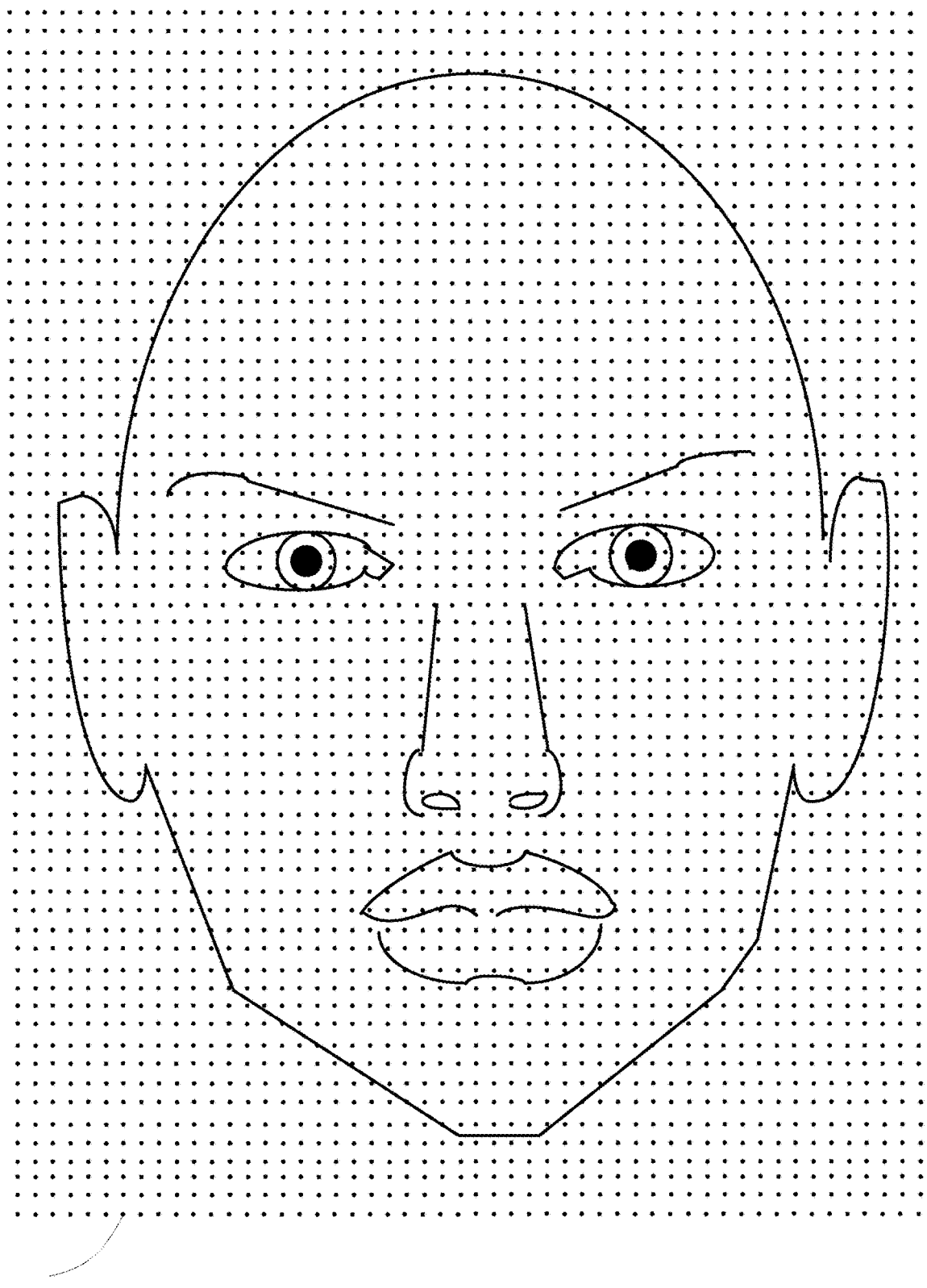
FIG. 12 is an example of key points and a visual representation of a first face.

FIGS. 11 and 12 illustrate examples of key points (denoted 40 in FIG. 11 and denoted 41 in FIG. 12). The key points 41 of FIG. 12 are denser than the key points 40 of FIG. 11). The grid of key points may include less than ten key points, more than ten key points, tens of key points, and even hundreds of key points.

There may be provided any density of key points. It may be beneficial to allocate multiple key points per facial artifacts—thereby increasing the resolution.

The first part of the CNN may consist essentially of the input layer of the CNN and only some of the intermediate layers of the CNN.

The first part of the CNN may consist essentially of the input layer of the CNN and less than half of the intermediate layers of the CNN.

The first 3D output and the second 3D output may be outputted from a single intermediate layer of the first part of the CNN.

The first 3D output and the second 3D output may be outputted from a plurality of intermediate layers of the first part of the CNN.

The first 3D output and the second 3D output may include information regarding image properties that do not amount to object detection conclusions.

The first 3D output and the second 3D output may differ from object detection outputs.

Different second feature vectors may be associated with different second key points, the second key points are mapped to different areas of the visual representation of the second face. A key point may be positioned at the center of the area but may be located outside the center. The area may have a rectangular shape but this is not necessarily so.

Different first feature vectors may be associated with different first key points, the first key points are mapped to different areas of the visual representation of the first face.

Figure 10:
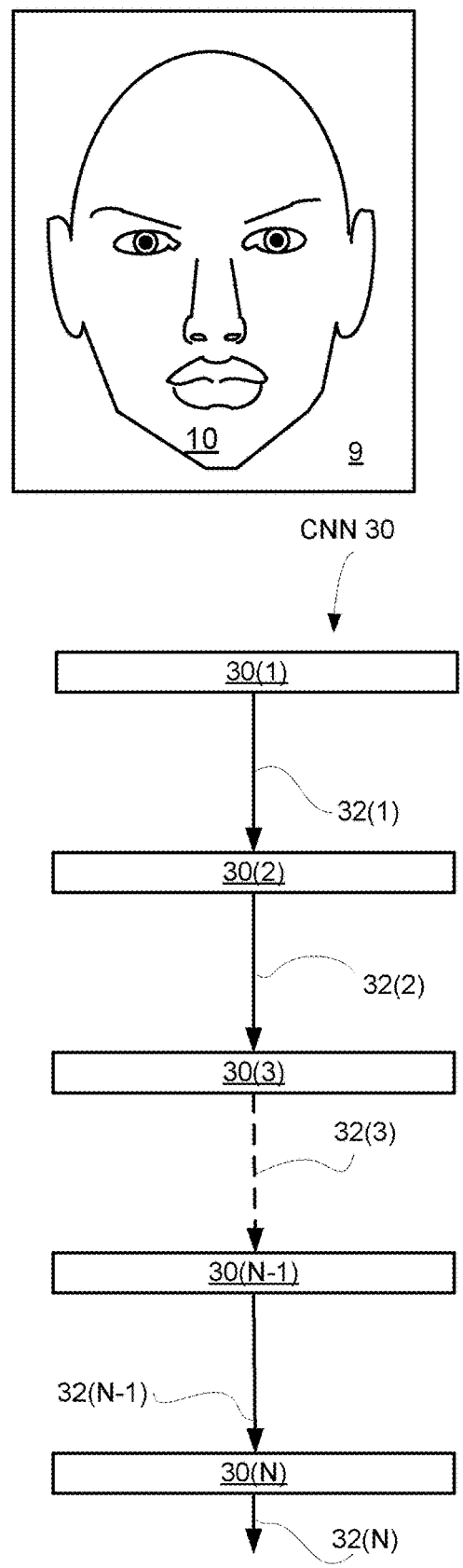
FIG. 10 is an example of a convolutional neural network and a visual representation of a first face.

Referring to FIG. 10—an input image 9 that includes visual representation of the first face 10 is fed to CNN 30. CNN 30 includes N layers, the first layer 30(1) is an input layer, the last layer (the Nth layer) 30(N) is an output layer, other layers (for example second layer 30(2), third layer 30(3), till (N−1)'th layer 30(N−1) are intermediate layers.

The outputs of the different layers of CNN 30 are denoted 32(1), 32(2), 32(3), . . . 32(N−1), and 32(N).

At least the outputs of intermediate layers 32(2)-32(N−1) are three dimensional outputs that include multiple feature vectors.

Steps 220 and 230 may be followed by step 240 of determining similarities between the different areas of the visual representation of the second face and the different areas of the visual representation of the second face.

Similarities may be calculated in any manner—for example by correlations between corresponding feature vectors.

Step 240 may include calculating similarities between a first feature vector associated with a first key point and between a second feature vector associated with a second key point that is located at the same location as the first key point.

Step 140 may include calculating similarities between a first feature vector associated with a first key point and between second feature vectors associated with second key points, wherein the second key points are located within a search window that includes a second key point that is located at the same location as the first key point.

Figure 13:
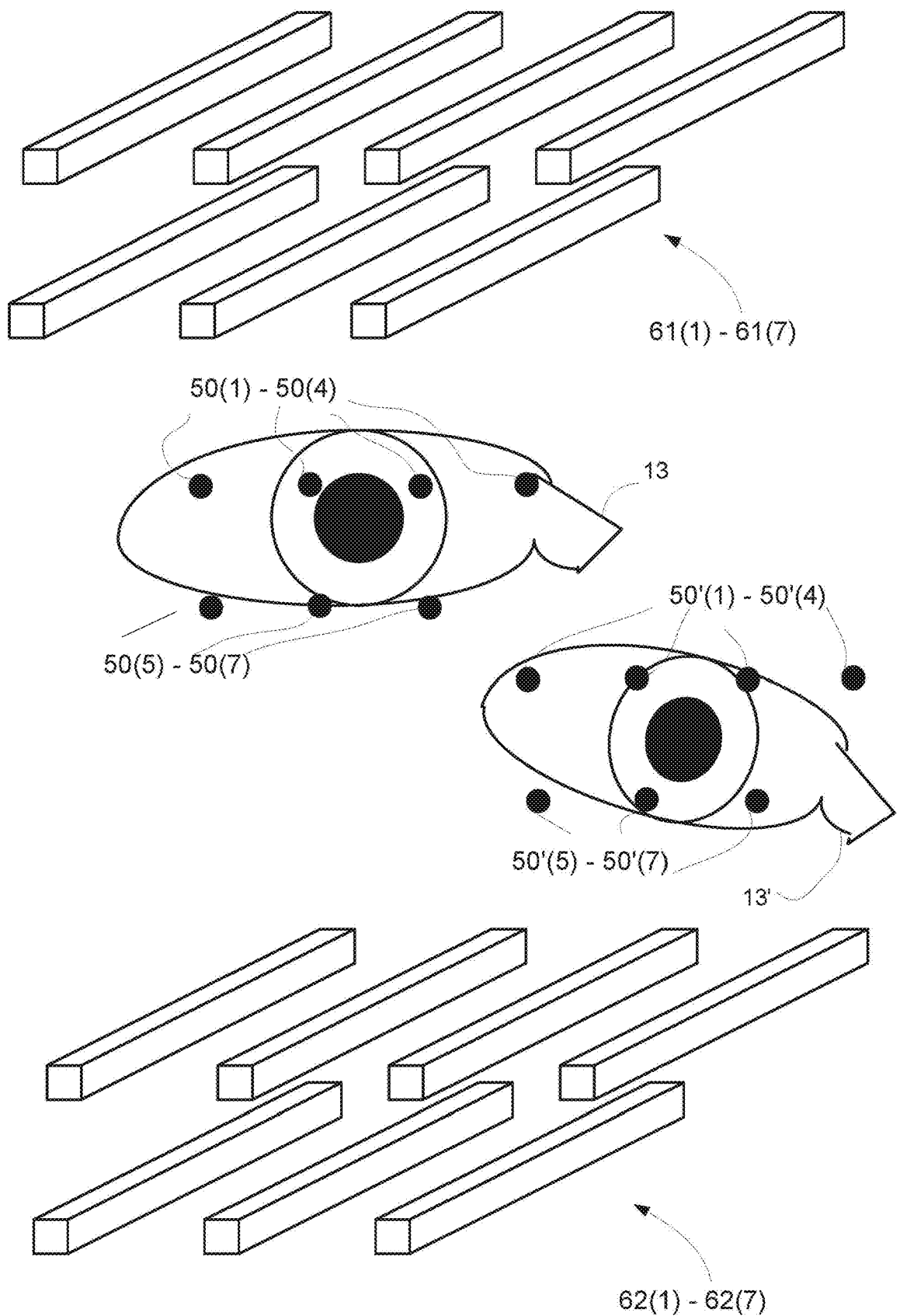
FIG. 13 is an example of key points, vectors and eyes.

For example—referring to FIG. 13:

A visual representation of first right eye 13 falls on seven first key points 50(1)-50(7) that are associated with first feature vectors 61(1)-61(7).

A visual representation of second right eye 13' falls on seven second key points 50(1)-50(7) that are associated with second feature vectors 62(1)-62(7).

Step 240 may include calculating the similarity between first vector 61(1) and second vector 62(1), between first vector 61(2) and second vector 62(2), between first vector 61(3) and second vector 62(3), between first vector 61(4) and second vector 62(4), between first vector 61(5) and second vector 62(5), between first vector 61(6) and second vector 62(6), and between first vector 61(7) and second vector 62(7).

Step 240 may be followed by step 250 of responding to the outcome of the similarities.

Step 250 may include performing at least one out of populating a database with similarity information regarding the similarities.

Figure 14:
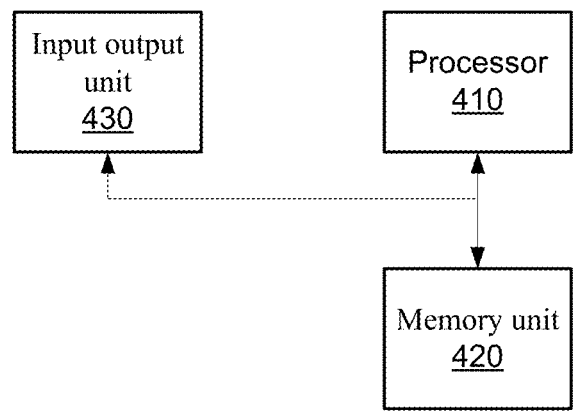
FIG. 14 is an example of a computerized system.

FIG. 14 illustrates an example of a computerized system 400. The computerized system may be configured to execute method 100 and/or method 200.

The computerized system may include a processor 410 that may include one or more processing circuits, a memory unit 420 and an input output unit 430. The memory unit 420 is configured to store commands, intermediate data, match results, and the like. The input output unit 430 may receive information and may output information. The processor 410 may be a neural network processor, may implement instructions that once executed perform CNN processing, and the like. The computerized system may be one or more computers, may be located in the cloud, may be located in any place and may be adapted to receive information over any network.

It should be noted that the

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the aft will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within the same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for high resolution face matching, the method comprises:
obtaining a visual representation of a first face and a visual representation of a second face; wherein the visual representations of the first and second faces are substantially aligned and are substantially of a same size;

for each part out of a group of parts of the visual representation of a first face, (a) masking the part of the visual representation of a first face to provide a part-masked visual representation of the first face, and (b) matching the part-masked visual representation of the first face to the visual representation of the second face to provide a match result related to the part;

determining relevancies of the parts of the group based on match results related to the parts;

generating parts relevancy indications that are indicative of the relevancies of the parts, wherein the parts relevancy indications are indicative of at least a first group of highly relevant parts of the group; and populating a database with the parts relevancy indications.

2. The method according to claim 1 wherein parts of lower relevancy are associated with match results that are indicative of a better matching between their part-masked visual representation of the first face and the visual representation of the second face.

3. The method according to claim 1 further comprising displaying of the parts relevancy indication, wherein the displaying of the parts relevancy indication comprises overlaying the parts relevancy indications on the visual representation of the first face.

4. The method according to claim 1, further comprising displaying of the parts relevancy indication, wherein the displaying of the parts relevancy indication comprises displaying a heatmap that represents parts relevancies.

5. The method according to claim 1 wherein the obtaining comprises generating the visual representations of the first and second faces by at least one out of cropping, aligning, and size matching.

6. The method according to claim 1 wherein the group of parts covers an entire face.

7. The method according to claim 1 wherein the group of parts covers less than an entire face.

8. The method according to claim 1 wherein at least two parts are facial landmarks.

9. A non-transitory computer readable medium for high resolution face matching, the non-transitory computer readable medium stores instructions for:

obtaining a visual representation of a first face and a visual representation of a second face; wherein the visual representations of the first and second faces are substantially aligned and are substantially of a same size;

for each part out of a group of parts of the visual representation of a first face, (a) masking the part of the visual representation of a first face to provide a part-masked visual representation of the first face, and (b) matching the part-masked visual representation of the first face to the visual representation of the second face to provide a match result related to the part;

determining relevancies of the parts of the group based on match results related to the parts;

generating parts relevancy indications that are indicative of the relevancies of the parts, wherein the parts relevancy indications are indicative of at least a first group of highly relevant parts of the group; and populating a database with the parts relevancy indications.

10. The non-transitory computer readable medium according to claim 9 wherein parts of lower relevancy are associated with match results that are indicative of a better matching between their part-masked visual representation of the first face and the visual representation of the second face.

11. The non-transitory computer readable medium according to claim 9 that stores instructions for displaying of the parts relevancy indication, wherein the displaying of the parts relevancy indication comprises overlaying the parts relevancy indications on the visual representation of the first face.

12. The non-transitory computer readable medium according to claim 9, that stores instructions for displaying of the parts relevancy indication, wherein the displaying of the parts relevancy indication comprises displaying a heatmap that represents parts relevancies.

13. The non-transitory computer readable medium according to claim 9 wherein the obtaining comprises generating the visual representations of the first and second faces by at least one out of cropping, aligning, and size matching.

14. The non-transitory computer readable medium according to claim 9 wherein the group of parts covers an entire face.

15. The non-transitory computer readable medium according to claim 9 wherein the group of parts covers less than an entire face.

16. The non-transitory computer readable medium according to claim 9 wherein at least two parts are facial landmarks.

17. A computerized system comprising a processor that is configured to:

obtain a visual representation of a first face and a visual representation of a second face; wherein the visual representations of the first and second faces are substantially aligned and are substantially of a same size;

for each part out of a group of parts of the visual representation of a first face, (a) mask the part of the visual representation of a first face to provide a part-masked visual representation of the first face, and (b) match the part-masked visual representation of the first face to the visual representation of the second face to provide a match result related to the part;

determine relevancies of the parts of the group based on match results related to the parts;

generate parts relevancy indications that are indicative of the relevancies of the parts; and display of the parts relevancy indication, wherein the displaying of the parts relevancy indication comprises displaying a heatmap that represents parts relevancies.

18. The method according to claim 1 wherein a masking of a part of the group of parts to provide a part-mask visual representation of the first face that is related to the part is executed before performing any matching of any part-mask visual representation of the first face to the second face.

19. The method according to claim 1 wherein a masking of a part of the group of parts to provide a part-mask visual representation of the first face is executed regardless of any previously generated match result.

* * * * *